Dec. 26, 1933.  A. GERARDI  1,940,795
PENDULAR SUSPENSION FOR REAR DRIVING WHEELS OF MOTOR VEHICLES
Filed Dec. 3, 1932
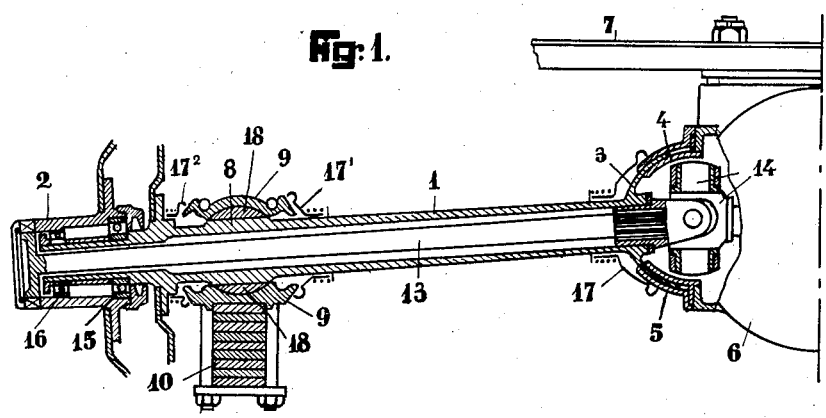
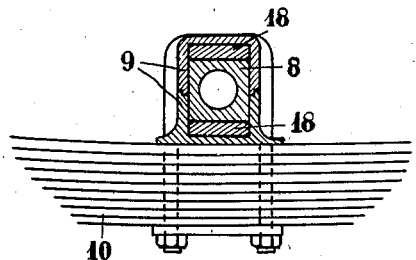
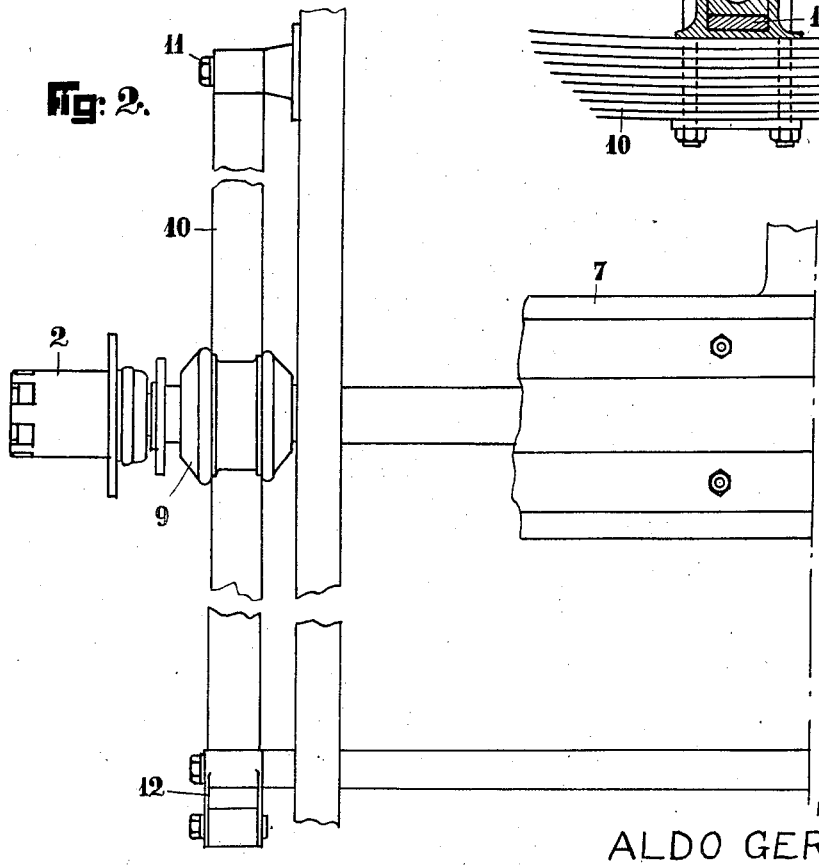
INVENTOR
ALDO GERARDI
BY Haseltine, Lake & Co.,
ATTORNEYS Patented Dec. 26, 1933

1,940,795

UNITED STATES PATENT OFFICE 1,940,795

PENDULAR SUSPENSION FOR REAR DRIVING WHEELS OF MOTOR VEHICLES

Aldo Gerardi, Galliate, Novara, Italy

Application December 3, 1932. Serial No. 645,629

15 Claims. (Cl. 180—70)

This invention relates to motor cars and more particularly refers to improvements in rear wheel suspensions of the type where two half axles, each carrying a driving wheel, are provided, said half axles being each capable of independent angular movement in a vertical plane with respect to a longitudinally mounted common driving shaft.

In a broad sense the idea of mounting each rear wheel of a motor car at the outer end of a hollow half axle, free to oscillate in a vertical plane at right angles to the longitudinal axis of a differential casing, fixed upon the frame of the car, is not new. However, in arrangements of this character heretofore known it was customary to rigidly connect each half axle to the leaf spring carried by the under frame of the motor car at the corresponding side, so that oscillatory movements of the half axles resulted in the generation of transversely directed forces, exerted against and tending to cause lateral distortion of the springs. These forces would in turn interfere with the free play of the springs, reacting unfavorably on the smooth riding qualities of the car. In extreme cases of sudden and severe shocks, the transversely directed force exerted by a half axle against the spring connected thereto might actually result in breakages of parts or other injury to the car structure, or at least, would result in a total loss of flexibility of the system after a certain limit of deformation had been reached.

The primary object of this invention is to secure the advantages deriving from a pendular suspension of the character specified, while at the same time preserving the free play of the suspension springs and the consequent smooth riding qualities of the car.

Another object is to provide in a pendular suspension of the character specified a novel and improved sliding connection between each half axle and the corresponding spring, said connection permitting axial displacement of the half axle with respect to the spring and also permitting relative angular displacement of said two parts in a vertical plane.

A further object is to provide a novel and improved type of pendular suspension of the rear driving wheels of a motor car, whereby by allowing vertical oscillatory movements of each half axle to have full and unhampered play, it becomes possible to effectively check the tendency to skidding which develops when taking curves at relatively high speeds.

Other objects and advantages of the present invention will more fully appear as the description proceeds and will be set forth and claimed in the appended claims.

My invention is illustrated by way of example in the accompanying drawing, in which:

Fig. 1 is a fragmentary rear view in elevation, partly sectioned, of a driving wheel suspension embodying my invention;

Fig. 2 is a plan view thereof; and

Fig. 3 is a cross section through the pivotal bearing attached to the elliptic spring.

As stated in the premises, one of the objects of my invention is to provide an arrangement insuring free play of the hollow half axles carrying the driving wheels which are oscillatable in a vertical plane, with respect to a fixed gear casing, to which they are connected by a pivotal joint.

The main advantage to be derived from the type of suspension to which this invention refers is that since each wheel can oscillate vertically independently of the other when passing over an obstacle in the road, the shock produced thereby will be transmitted to the frame of the vehicle in a very attenuated form.

Another advantage is that the differential gear casing which is, in this case, fixed onto the frame of the car instead of forming part of a rear axle of the ordinary type attached to the frame solely by means of the suspension springs, provides a fixed reaction point against the tendency of the body of the car to swing outwardly, due to the centrifugal force which develops when the car is taking a curve.

Under ordinary conditions the centrifugal force applied to the mass of the car body and opposed by the resistance against lateral displacement exerted by the road against the wheels, causes side swaying of the body with respect to the wheels and consequent lateral distortion of the suspension springs.

By virtue of the present construction, the reaction of the ground against the wheels is transmitted to the frame and body of the car, not only by the suspension springs, but also by the semi-axles which act as rigid members, interposed between the wheels and the frame, working as compression and tension members, respectively. This virtually rigid axial connection between the wheels and the body helps to check the effects of centrifugal force at the very outset and will accordingly materially check the tendency of the car to skidding.

The resistance to skidding is furthermore gradually increased due to the capacity of the semi-axles carrying the driving wheels to oscillate in a vertical plane. In fact, when the car is driven around a curve the centrifugal force causes the weight of the frame and body to press against the outer springs, which are thus compressed, causing vertical angular displacement of the semi-axle at the corresponding side towards the underside of the frame.

This change in the vertical alinement of the semi-axle causes a corresponding change in the vertical alinement of the wheel carried thereby, and said wheel, which is normally inwardly inclined from top to bottom, will gradually come to occupy a vertical position, and as the compression of the springs increases will even pass beyond this point and assume an outward inclination from top to bottom.

Since the fractional resistance offered by the ground against the wheel increases as the inclination of the wheel with respect to the ground varies in the manner set forth, it is obvious that the greater the speed of the car, resulting in a greater centrifugal force being applied thereto, the greater the resistance offered by the outer wheel to skidding will be.

While, as explained, the centrifugal force developed while the car travels around a curve causes the frame to press on the outer suspension springs, it conversely causes the inner springs to be partly relieved of the weight exerted upon them by the frame and body, so that the springs will somewhat raise the inner side of the frame with respect to the wheels at the corresponding side, and the point of pivotal attachment of the inner hollow half axle to the differential gear casing will also be raised to a certain extent, changing the inclination of the half axle so as to increase the angle formed by it with the ground.

This in turn results in the wheel mounted at the end of said half axle also acquiring a greater inward inclination, so that the inner wheel will also be angularly displaced with respect to a vertical plane in a direction tending to increase the resistance offered by the ground to skidding. Also in the case of the inner wheel, therefore, the greater the speed at which a curve is taken, the greater the resistance to skidding will be.

However, it is obvious that these advantages will not be realized if the half axles are rigidly connected to the suspension springs and the suspension springs are in their turn rigidly connected to the frame in the transverse sense, because the vertical angular displacements of the half axles will necessarily produce lateral stresses in the springs, tending to deform said springs up to a point where the springs will no longer "give" and the entire system becomes virtually a rigid system where no further angular displacements of the half axle will be possible.

The arrangement forming the subject of the present invention is such that the vertical angular displacements of the half axles can freely take place to any extent without generating lateral stresses in or inducing lateral deformations in the suspension springs, so that the advantages of an individual pivotal suspension for each wheel can be fully realized.

Referring to the drawing 1 designates a hollow half axle, carrying at its outer end the rotating hub 2 of the driving wheel and having its inner end pivotally connected to the differential gear casing 6 in a manner permitting angular displacements of said hollow half axle with respect to said gear casing, in a vertical plane.

In practice, I prefer to make the pivotal connection between parts 1 and 6 in the form of a spherical joint of which a spherical segment 3, integral with the inner end of half axle 1, forms a part. Said spherical segment 3 is housed between an inner spherical segment 4 and an outer spherical segment 5, both of which are integral with gear casing 6. The gear casing 6 is secured to a cross beam 7, forming part of the motor vehicle frame.

At a point close to the inner end of wheel hub 2, the half axle 1 is supported by a bearing 9, which is in its turn fixed onto the middle part of the elliptical spring 10. Said spring is longitudinally directed and is connected at its front end to the longitudinal beam of the under frame by means of a transversal pivot 11 and at its rear end through the interposition of a tension member 12, The wheel hub 2 is rigidly connected in the usual manner to a spindle 13, rotatably mounted within hollow half axle 1, the inner end of said spindle being connected to the drive shaft in the gear casing 6 by means of a Cardan connection 14. Ball bearing races 15 and 16 are provided between the inner surface of hub 2 and the outer surface of hollow half axle 1 in the usual manner.

The hollow half axle is mounted in bearing 9 in such a manner as to permit axial sliding movement of said half axle, with respect to said bearing, and angular displacements of said half axle with respect to said bearing in a vertical plane passing through the axis of said half axle, said plane being obviously at right angles to the longitudinal axis of the car frame. Where the suspension springs are longitudinally directed, as is the case in the embodiment illustrated, the plane of oscillation of the half axle is, of course, also at right angles to the vertical plane of the spring.

For the purposes of the present invention, however, it must be understood that it is not strictly necessary for the suspension spring itself to be set parallel to the longitudinal axis of the car frame, as long as the sliding pivotal connection between said spring and the corresponding half axle is such as to permit oscillatory movements of said half axle in a vertical plane substantially at right angles to the longitudinal axis of the car.

Bearing 9 is accordingly formed as an open box preferably having straight parallel front and rear vertical walls and the top and bottom in the form of segments of a cylinder, the axis of which crosses the axis of spindle 13 and is directed at right angles thereto.

The portion 8 of the hollow half axle passing through the bearing is preferably given a square or rectangular section, as Fig. 3 clearly shows, the width of said section being equivalent to the distance between the front and rear walls of bearing 9 and registering therewith with a sliding fit. Between the flat upper and lower surfaces of part 8 and the segmental cylindrical top and bottom surfaces of bearing 9, are inserted fillers or sectors 18, which act in unison with part 8 in constituting therewith the core of the longitudinal pivotal connection between said half axle and bearing 9, while permitting and guiding axial displacements of said part 8, with respect to said bearing.

By virtue of this construction it will be understood that rotation about its own axis, which might take place when the half axle is connected to the differential gear casing by a spherical joint, as shown, is positively prevented, while the axially sliding relation between the half axle and said bearing permits full play to the vertical angular displacements of said half axle with respect to its point of pivotal attachment to the differential gear casing, without causing any stresses or distortions in the suspension spring. Also it will be seen that the longitudinal pivotal connection thus established between the half axle and bearing 9 in its turn allows the angular displacement in a vertical plane of the half axle with respect to the bearing and the spring carrying the same to freely take place simultaneously with the axial displacements of the half axle.

Although part 8 of the half axle is made with a square section, in order to prevent angular displacements of said half axle about its own axis, it is obvious that any other outline or construction producing the same result can be adopted, if desired. However, if the half axle is connected to the gear casing by means of a horizontal pivot, instead of a spherical joint, such a manner of attachment would already prevent rotatory movements of the half axle about its own axis, as will be understood.

I found the spherical joint 3, 4, 5, where the movable member is sheathed between two stationary members, to be fairly effective in preventing the admission of dust to the gear casing; a dust proof condition is positively obtained by providing dust screen 17, covering the exposed part of the joint, as shown in Fig. 1.

In a similar manner the two open ends of bearing 9 are protected from the action of dust, mud, etc., by dust screens 17¹, 17², as shown.

In practice, I prefer to provide the pivotal attachment of each half axle to the gear casing at a point laterally spaced of the central line of said casing which, of course, coincides with the axis of the main driving shaft, as shown, although it is possible to so mount the half axles, with respect to the gear casing, as to cause their angular movement in the vertical plane to take place about the axis of the main driving shaft.

By adopting the arrangement shown, I secure two advantages, to wit: (1) I make it possible to use a differential of the ordinary, compact type within the gear casing and (2) I cause the vertical angular displacements of the half axles about their pivotal points of attachment to have a greater amplitude for a given deformation of the springs, so that the anti-skidding effect will be proportionately more pronounced, for the reasons above stated.

It will be observed that by using longitudinally directed elliptical suspension springs and by fixing the bearing for each half axle directly upon the corresponding spring, I provide an arrangement whereby the thrust of the half axles will be transmitted to the frame directly by the elliptical springs, without the intermediary of any other element. It will also be observed that by placing the bearing directly about the spring I make it possible to lower the body structure of the car, a desirable feature, as against those types of chassis where the suspension springs rest upon the axles.

From the foregoing it will be seen that I attain the various objects of my invention by the use of extremely simple means, permitting the employment of the usual longitudinally directed elliptical springs, although springs of a different type can be used, if desired.

It is obvious that the constructional details of the pendular suspension, forming the subject of this invention, as well as the arrangement of the various parts, may vary from those shown, without departing from the inventive idea; the drawing, therefore, will be understood as being intended for illustrative purposes only and not in a limiting sense.

I accordingly reserve the right to carry my invention into practice in all those ways and manners which may enter, fairly, into the scope of the appended claims.

I claim:

1. In a rear wheel drive for a motor vehicle comprising a differential gear casing fixed onto the vehicle frame, two wheel driving shafts extending one from each side of said gear casing, mounted so as to be capable of angular movement in a vertical plane with respect thereto, a half axle rotatably supporting each wheel driving shaft, pivotally connected to and extending laterally of said gear casing, so as to be capable of angular movement in a vertical plane with respect thereto coaxially with said wheel driving shaft, a wheel actuated by each wheel driving shaft, rotatably mounted at the outer end of its corresponding half axle, and spring means for supporting the vehicle frame upon said half axles, a bearing for each half axle interposed between said half axle and said spring supporting means, said bearing permitting axial displacements of said half axle with respect to said spring supporting means.

2. In a rear wheel drive for a motor vehicle comprising a differential gear casing fixed onto the vehicle frame, two wheel driving shafts extending one from each side of said gear casing, mounted so as to be capable of angular movement in a vertical plane with respect thereto, a half axle rotatably supporting each wheel driving shaft, pivotally connected to and extending laterally of said gear casing, so as to be capable of angular movement in a vertical plane with respect thereto coaxially with said wheel driving shaft, a wheel actuated by each wheel driving shaft, rotatably mounted at the outer end of its corresponding half axle, and spring means for supporting the vehicle frame upon said half axles, a bearing for each half axle interposed between said half axle and said spring supporting means, said bearing permitting axial displacements of said half axle with respect to said spring supporting means, and also permitting angular movements of said half axle about a horizontal axis crossing the axis of its corresponding wheel driving shaft, at right angles thereto.

3. In a rear wheel drive for a motor vehicle comprising a differential gear casing fixed onto the vehicle frame, two wheel driving shafts extending one from each side of said gear casing, mounted so as to be capable of angular movement in a vertical plane with respect thereto, a half axle rotatably supporting each wheel driving shaft, pivotally connected to and extending laterally of said gear casing, so as to be capable of angular movement in a vertical plane with respect thereto coaxially with said wheel driving shaft, a wheel actuated by each wheel driving shaft, rotatably mounted at the outer end of its corresponding half axle, and spring means for supporting the vehicle frame upon said half axles, a bearing for each half axle interposed between said half axle and said spring supporting means, said bearing permitting axial displacements of said half axle with respect to said spring supporting means, and also permitting angular movements of said half axle about a horizontal axis crossing the axis of its corresponding wheel driving shaft, at right angles thereto, while preventing angular movements of said half axle about its own axis.

4. In a rear wheel drive for a motor vehicle comprising a differential gear casing fixed onto the vehicle frame, two wheel driving shafts extending one from each side of said gear casing, mounted so as to be capable of angular movement in a vertical plane with respect thereto, a half axle rotatably supporting each wheel driving shaft, pivotally connected to and extending laterally of said gear casing, so as to be capable of angular movement in a vertical plane with respect thereto coaxially with said wheel driving shaft, and a wheel actuated by each wheel driving shaft, rotatably mounted at the outer end of its corresponding half axle, a longitudinally directed spring supporting each side of the vehicle frame upon the corresponding half axle, and transmitting to said frame the thrust of said half axle, and a bearing for said half axle, carried by said spring, permitting axial displacements of said half axle with respect to said spring.

5. In a rear wheel drive for a motor vehicle comprising a differential gear casing fixed onto the vehicle frame, two wheel driving shafts extending one from each side of said gear casing, mounted so as to be capable of angular movement in a vertical plane with respect thereto, a half axle rotatable supporting each wheel driving shaft, pivotally connected to and extending laterally of said gear casing, so as to be capable of angular movement in a vertical plane with respect thereto coaxially with said wheel driving shaft, and a wheel actuated by each wheel driving shaft, rotatably mounted at the outer end of its corresponding half axle, a longitudinally directed spring supporting each side of the vehicle frame upon the corresponding half axle, and transmitting to said frame the thrust of said half axle, and a bearing for said half axle, carried by said spring, permitting axial displacements of said half axle with respect to said spring, and also permitting angular movements of said half axle about a horizontal axis crossing the axis of its corresponding wheel driving shaft, at right angles thereto.

6. A rear wheel drive for a motor vehicle comprising a differential gear casing fixed onto the vehicle frame, two wheel driving shafts extending one from each side of said gear casing, mounted so as to be capable of angular movement in a vertical plane with respect thereto, a half axle rotatably supporting each wheel driving shaft, pivotally connected to and extending laterally of said gear casing, so as to be capable of angular movement in a vertical plane with respect thereto coaxially with said wheel driving shaft, a wheel actuated by each wheel driving shaft, rotatably mounted at the outer end of its corresponding half axle, spring means for supporting the vehicle frame upon said half axles, and means for supporting said spring means upon said half axles, permitting axial displacements of the latter with respect to the former.

7. A rear wheel drive for a motor vehicle comprising a differential gear casing fixed onto the vehicle frame, two wheel driving shafts extending one from each side of said gear casing, mounted so as to be capable of angular movement in a vertical plane with respect thereto, a half axle rotatably supporting each wheel driving shaft, pivotally connected to and extending laterally of said gear casing, so as to be capable of angular movement in a vertical plane with respect thereto coaxially with said wheel driving shaft, a wheel actuated by each wheel driving shaft, rotatably mounted at the outer end of its corresponding half axle, spring means for supporting the vehicle frame upon said half axles, and means for supporting said spring means upon said half axles, permitting axial displacements of the latter with respect to the former, and also permitting angular movements of each half axle about a horizontal axis crossing the axis of its corresponding wheel driving shaft, at right angles thereto.

8. In a rear wheel drive for a motor vehicle the combination, with a vehicle frame, a differential gear casing fixed thereto, and a half axle extending laterally of and mounted so as to be capable of angular movements in a vertical plane with respect to said casing, of an elliptical spring for supporting said frame upon said half axle, and a bearing for said half axle carried by and upwardly extending from the central portion of said spring, permitting axial displacements of said half axle with respect thereto.

9. In a rear wheel drive for a motor vehicle the combination, with a vehicle frame, a differential gear casing fixed thereto, a half axle extending laterally of and mounted so as to be capable of angular movements in a vertical plane with respect to said casing, and a spring suspension member interposed between said frame and said half axle, of a bearing for said half axle carried by said spring suspension member, said bearing comprising a box fixed onto said spring suspension member, and bushing means permitting axial displacements of said half axle with respect to said box, said bushing means being capable of angular movement about a horizontal axis crossing the axis of said half axle at right angles thereto.

10. In a rear wheel drive for a motor vehicle the combination, with a vehicle frame, a differential gear casing fixed thereto, and a half axle extending laterally of and mounted so as to be capable of angular movements in a vertical plane with respect to said casing, of an elliptical spring for supporting said frame upon said half axle, and a bearing for said half axle carried by and upwardly extending from the central portion of said spring, said bearing comprising a box fixed onto said spring, and bushing means permitting axial displacements of said half axle with respect to said box, said bushing means being capable of angular movement about a horizontal axis crossing the axis of said half axle at right angles thereto.

11. In a rear wheel drive for a motor vehicle the combination, with a vehicle frame, and a differential gear casing fixed thereto, of a half axle extending laterally of and mounted so as to be capable of angular movements in a vertical plane with respect to said casing, said half axle having a bearing portion with flat vertical side and flat top and bottom surfaces, a spring suspension member interposed between said frame and said half axle, and a bearing for said half axle carried by said spring suspension member, said bearing comprising a box registering with the vertical side surfaces of said bearing portion, fixed onto said spring suspension member, said box having cylindrical segmental top and bottom surfaces coaxial with a horizontal axis crossing the axis of said half axle at right angles thereto, and sector members registering with and interposed between the flat top and bottom surfaces of said bearing portion and the cylindrical segmental surfaces of said box, said sector members coacting with said box in permitting axial displacements of said half axle with respect thereto, and angular displacements thereof about the axis of said cylindrical surfaces.

12. In a rear wheel drive for a motor vehicle comprising a differential gear casing fixed onto the vehicle frame, two wheel driving shafts extending one from each side of said gear casing, mounted so as to be capable of angular movement in a vertical plane with respect thereto, a half axle rotatably supporting each wheel driving shaft pivotally connected to and extending laterally of said gear casing, so as to be capable of angular movement in a vertical plane with respect thereto coaxially with said wheel driving shaft, and a wheel actuated by each wheel driving shaft, rotatably mounted at the outer end of its corresponding half axle, a longitudinally directed spring supporting each side of the vehicle frame upon the corresponding half axle, and transmitting to said frame the thrust of said half axle, and a bearing for said half axle, carried by said spring, permitting axial displacements of said half axle with respect to said spring, and angular displacements thereof about a horizontal axis crossing the axis of said half axle, at right angles thereto.

13. In a rear wheel drive for a motor vehicle the combination, with a vehicle frame, a differential gear casing fixed thereto, and a half axle extending laterally of and mounted so as to be capable of angular movements in a vertical plane with respect to said casing, of an elliptical spring for supporting said frame upon said half axle, and a bearing for said half axle carried by and upwardly extending from the central portion of said spring, said bearing comprising a box fixed onto said spring, and bushing means permitting axial displacements of said half axle with respect to said box, said bushing means being capable of angular movement about a horizontal axis crossing the axis of said half axle at right angles thereto, and preventing angular displacements of said half axle about its own axis.

14. In a rear wheel drive for a motor vehicle the combination, with a vehicle frame, and a differential gear casing fixed thereto, of a half axle extending laterally of and mounted so as to be capable of angular movements in a vertical plane with respect to said casing, said half axle having a bearing portion with flat vertical side and flat top and bottom surfaces, an elliptical spring having its ends attached to said frame, and a bearing for said half axle mounted upon said spring, said bearing comprising a box fixed onto said spring, and bushing means for said half axle within said box, said bushing means being capable of angular displacements with respect to said box about an axis crossing at right angles the axis of said half axle, and permitting axial displacements of said half axle with respect to said box and spring.

15. In a motor car, the combination with a frame, a support fixed centrally thereto, and two half axles extending transversely of said frame one from each side of said support, connected thereto so as to be capable of angular movement in a substantially vertical plane with respect thereto, of a leaf spring connected at its ends to the frame and between its ends to a half axle, and a bearing for each half axle carried by its spring, fixed to said spring and pivotally and slidably mounted on the half axle for permitting axial displacement of said half axle with respect to said spring, and also permitting angular movements of said half axle about a horizontal axis located on a plane crossing the axis of said half axle, at right angles thereto.

ALDO GERARDI.